US010137854B2

(12) United States Patent
Shen et al.

(10) Patent No.: US 10,137,854 B2
(45) Date of Patent: Nov. 27, 2018

(54) HEADLINER ASSEMBLY FOR A VEHICLE AND A VEHICLE SYSTEM USING THE SAME

(71) Applicant: Ford Global Technologies, LLC, Dearborn, MI (US)

(72) Inventors: Kevin Shen, Nanjing (CN); Alvin Liu, Nanjing (CN); Paul Alan Forgette, Brownstown, MI (US); Xuezhi Jin, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 15/446,257

(22) Filed: Mar. 1, 2017

(65) Prior Publication Data

US 2017/0291568 A1 Oct. 12, 2017

(30) Foreign Application Priority Data

Apr. 7, 2016 (CN) .......................... 2016 1 0214229

(51) Int. Cl.
*B60R 21/214* (2011.01)
*B60R 13/02* (2006.01)
*B60R 21/231* (2011.01)
*B60R 21/232* (2011.01)

(52) U.S. Cl.
CPC ........ *B60R 21/214* (2013.01); *B60R 13/0212* (2013.01); *B60R 21/232* (2013.01); *B60R 21/23138* (2013.01); *B60R 2013/0287* (2013.01)

(58) Field of Classification Search
CPC . B60R 21/214; B60R 13/0212; B60R 21/232; B60R 21/23138
See application file for complete search history.

(56) References Cited

U.S. PATENT DOCUMENTS

| 3,953,067 A | | 4/1976 | Isola | |
|---|---|---|---|---|
| 4,211,590 A | * | 7/1980 | Steward | B29C 51/14 156/79 |
| 4,256,797 A | * | 3/1981 | Stamper | B32B 27/08 428/215 |
| 5,484,186 A | * | 1/1996 | Van Order | B60R 16/0207 296/214 |
| 5,795,015 A | * | 8/1998 | Corpe | B60R 13/0212 296/214 |
| 6,070,902 A | * | 6/2000 | Kowalski | B60R 13/0225 280/730.2 |

(Continued)

FOREIGN PATENT DOCUMENTS

JP 10138858 5/1998

OTHER PUBLICATIONS

Long, Dave, "Side Airbags and Side Curtain Airbags", http://www.emsworld.com/article/10322668/side-airbags-and-side-curtain-airbags, Jul. 17, 2006.

*Primary Examiner* — Darlene P Condra
(74) *Attorney, Agent, or Firm* — Alice Xu; Mohr IP Law Solutions, PC

(57) ABSTRACT

The present disclosure provides a headliner assembly for a vehicle. The headliner assembly includes a base panel and a cover layer disposed below the base panel. The base panel includes an edge in a length direction of the vehicle and a portion adjacent to the edge and having a plurality of notches. The cover layer has an edge extending beyond the edge of the base panel.

19 Claims, 4 Drawing Sheets

(56) References Cited

U.S. PATENT DOCUMENTS

| | | | |
|---|---|---|---|
| 6,824,164 B2* | 11/2004 | Pywell | B60R 21/08 |
| | | | 280/730.2 |
| 7,237,834 B2* | 7/2007 | Czinki | B60R 13/0225 |
| | | | 296/208 |
| 7,607,684 B2 | 10/2009 | Downey et al. | |
| 7,946,615 B2 | 5/2011 | Takahashi et al. | |
| 8,434,782 B2 | 5/2013 | Asano | |
| 8,764,891 B1* | 7/2014 | Brown | B60R 13/0231 |
| | | | 296/216.07 |
| 9,022,421 B2 | 5/2015 | Zucal | |
| 2001/0011834 A1* | 8/2001 | Boyce | B60H 1/247 |
| | | | 296/190.09 |
| 2003/0141005 A1* | 7/2003 | Donatti | B29C 44/065 |
| | | | 156/79 |
| 2005/0127718 A1* | 6/2005 | Cormier | B29C 51/10 |
| | | | 296/214 |
| 2008/0258507 A1* | 10/2008 | Dykman | B60R 13/0231 |
| | | | 296/216.07 |
| 2011/0301816 A1* | 12/2011 | Gandhi | B60R 21/013 |
| | | | 701/45 |
| 2017/0246995 A1* | 8/2017 | Sanchez Cruz | B60R 13/0206 |
| 2018/0079373 A1* | 3/2018 | Rodriguez Tejido | |
| | | | B60R 13/0231 |

* cited by examiner

HEADLINER ASSEMBLY FOR A VEHICLE AND A VEHICLE SYSTEM USING THE SAME

RELATED APPLICATION

This application claims the benefit of Chinese Patent Application No.: CN 201610214229.4 filed on Apr. 7, 2016, the entire contents thereof being incorporated herein by reference.

FIELD

The present disclosure relates to a vehicle interior trim, particularly relates to a headliner assembly for a vehicle, a vehicle system including the headliner assembly, and a method for preparing the headliner assembly.

BACKGROUND

With the increased regulation on the vehicle safety, more and more vehicles are equipped with curtain airbags to reduce injuries to passengers during a vehicle side impact collision. A curtain airbag is typically folded between a headliner and a roof sheet metal at an uninflated state, and will break through a coupling between the headliner and a side trim of the vehicle and then be deployed along a predetermined passage when inflated upon the side impact collision of the vehicle. Because the deployment of curtain airbag deforms an edge of the headliner, the design of headliner influences the deployment of the curtain airbag. Various approaches have been developed to improve the deployment of the curtain airbags. For example, U.S. Pat. No. 6,142,506 discloses an energy absorbing vehicle trim and an airbag. The trim piece is spaceably mounted to the energy absorbing member and cooperative therewith to move from a covering position covering the inflatable restraint in an uninflated state to a deployed position so as to partially deflect from the vehicle body structure to allow the inflatable restraint to inflate along the surfaces adjacent the vehicle body structure. In another example, U.S. Pat. No. 8,876,152 discloses an inflatable restraint assembly including a guide ramp. At least a portion of the inflatable curtain portion of the curtain airbag module extends along the guide ramp when the inflatable curtain portion is in the deployed configuration.

SUMMARY

According to one aspect of the present disclosure, a headliner assembly for vehicle is provided. The headliner assembly includes a base panel and a cover layer disposed below the base panel in a height direction of the vehicle. The base panel includes an edge along a length direction of the vehicle, and a portion adjacent to the edge and having a plurality of notches. The cover layer includes an edge extending beyond the edge of the base panel.

In an embodiment, the edge of the cover layer may extend beyond the edge of the base panel in a width direction of the vehicle, and may extend about 1 mm to about 3 mm from the edge of the base panel.

In another embodiment, the notch may have a cross-section having a shape selected from one of V-shape, rectangle, semi-circle, trapezoid, and combinations thereof.

In another embodiment, the notch may have a depth of about 2 mm to about 8 mm.

In another embodiment, the cover layer may be attached on a bottom surface of the base panel via adhesives.

In another embodiment, the base panel may be formed from polymer foam material, and the cover layer may be formed from fabrics.

According to another aspect of the present disclosure, a vehicle system is provided. The vehicle system includes a base panel on a top of a vehicle, a cover layer disposed under the base panel, and a first side trim having an upper end contacting a lower surface of the cover layer. The base panel includes a first portion adjacent to an edge along a length direction of the vehicle and the first portion includes a plurality of notches. The cover layer includes an edge extending beyond the edge of the base panel in a width direction of the vehicle. The upper end of the first side trim corresponds to the first portion of the base panel, and forms interference fit with the base panel and the cover layer.

In an embodiment, the upper end of the side trim may partially overlap the notches of the first portion of the base panel in the width direction of the vehicle.

In another embodiment, the first portion of the base panel may have a length substantially smaller than, equal to, or greater than that of the first side trim along the length direction of the vehicle.

In another embodiment, a distance between an outer edge of the upper end of the first side trim and the edge of the cover layer in the width direction of the vehicle may be about 3 mm to about 10 mm.

In another embodiment, the upper end of the first side trim may have a greater surface roughness relative to remaining portions of the first side trim.

In another embodiment, the vehicle system may further include an airbag folded above the base panel and adjacent to the edge of the base panel in an uninflated state. The airbag may be inflated in a working state, expanded under a side impact accident to form a gap between the edge of the base panel and the upper end of the first side trim, and deployed downwards through the gap.

In another embodiment, the airbag may be a curtain airbag.

In another embodiment, the first side trim may be a front pillar trim or rear pillar trim of the vehicle.

In another embodiment, the vehicle system may further include a second side trim. The base panel may further include a second portion adjacent to its edge in the length direction and having a plurality of notches. The upper end of the second side trim corresponds to the second portion of the base panel and contacts with a bottom surface of the cover layer to form interference fit with the base panel and the cover layer. The second side trim may be a middle pillar trim of the vehicle.

According to yet another aspect of the disclosure, a method of preparing a headliner assembly for a vehicle is provided. The method includes providing a base panel and a cover layer for a headliner assembly; cutting an edge of the base panel to form a new edge such that an edge of the cover layer extends beyond the new edge of the base panel and forming a plurality of notches in a portion of the new edge of the base pan& that corresponds to a pillar trim for the body of the vehicle.

In an embodiment, cutting the base panel includes cutting the edge of the base panel such that the edge of the cover layer extends beyond the new edge of the base panel, and cutting the new edge of the base panel to form the notches.

In another embodiment, cutting the base panel is performed during one process such that the edge of the cover layer extends beyond the new edge of the base panel while the notches are formed in the base panel at the same time.

In an embodiment, the cutting is performed by water cutting.

In an embodiment, providing the cover layer includes attaching the cover layer on a bottom surface of the base panel via adhesives.

In an embodiment, providing the cover layer further includes connecting the base panel with the cover layer via press molding.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

DETAILED DESCRIPTION

Figure 1:
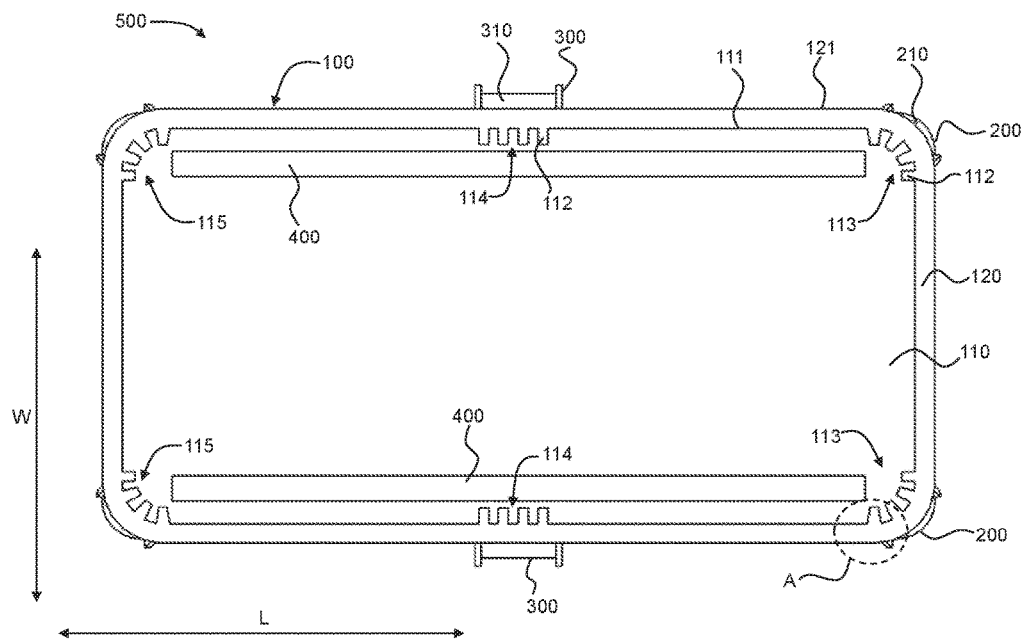
FIG. 1 is a cross-sectional view of an exemplary vehicle system according to an embodiment of the present disclosure, schematically illustrating a headliner assembly and a side trim of a vehicle body, and an airbag.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Safety is one of the aspects that vehicle manufacturers pay special attention. Airbag is one of the safety restraint components for a vehicle, and its deployment needs to be considered during the interior trim design. It is required that edges of a headliner and/or upper ends of a side trim cannot prevent the deployment of a curtain airbag.

The inventors of the present disclosure have recognized some issues concerning the connection between a headliner and a side trim of a vehicle. In some conventional designs, in order to facilitate molding process and aesthetic appearance, edges of a base panel of a headliner and a cover layer such as a fabric layer attached on the bottom surface of the base panel are aligned or non-abreast with each other, while an upper end of a side trim such as a pillar trim contacts with the fabric layer to form interference fit (e.g. lap joint) with the headliner. In some designs, the lap joint area between the side trim and the cover layer has a relatively shorter distance or the side trim is substantially aligned with the headliner. While such design may not prevent the airbag's deployment, it may cause the headline to be exposed, and affect the aesthetic appearance, and cause sealing problem of the vehicle. On the other hand, in the designs in which the distance between the lap joint area and the headliner is relatively longer, airbag deployment may be affected.

The inventors of the present disclosure have recognized one or more of the above-mentioned problems and provide a headliner assembly, a vehicle system including the headliner assembly, and a method for preparing the headliner assembly. The headliner assembly of the present disclosure has a simple structure and a better aesthetic appearance, and is easy to prepare. In addition, the requirements for deployment and sealing for airbags may be satisfied. Several embodiments of the present disclosure are described below with reference to the drawings.

Figure 2:
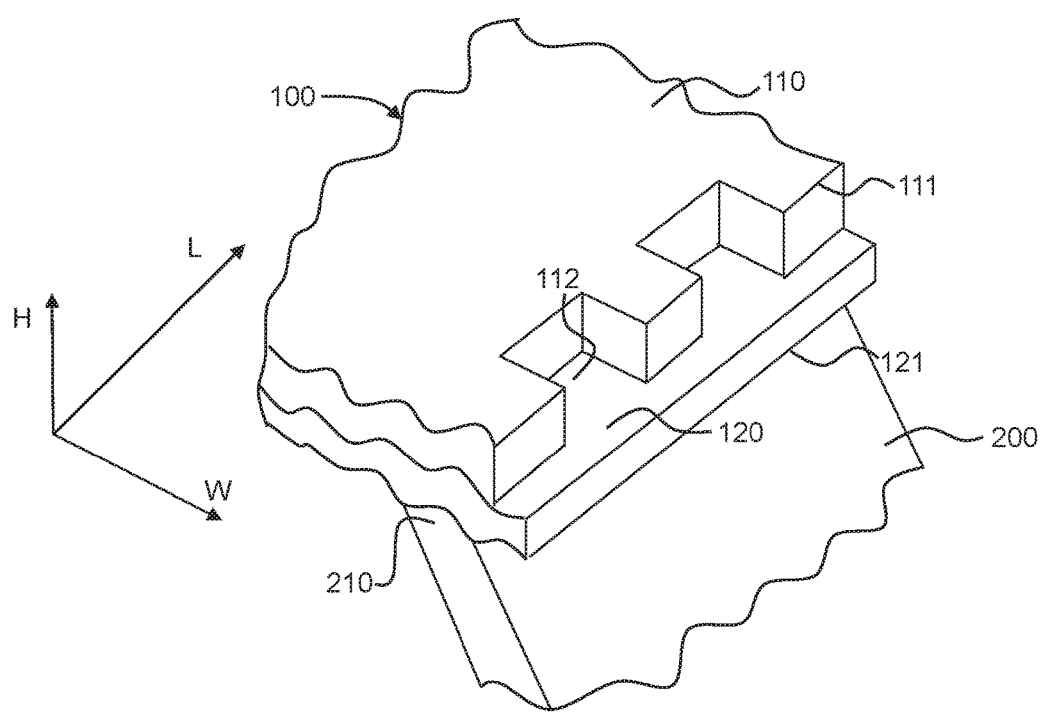
FIG. 2 is a partial enlarged perspective view of the headliner assembly and the side trim of the vehicle system of FIG. 1.

FIG. 1 is a top view of a cross section of a vehicle system 500 according to an example embodiment of the present disclosure, illustrating a headliner assembly, a side trim, and airbags. FIG. 2 is a partial enlarged perspective view of the headliner assembly and the side trim of FIG. 1. With reference to FIG. 1, in some embodiments, the vehicle system 500 includes a headliner assembly 100, a side trim 200, and an airbag 400. The headliner assembly 100 includes a base panel 110 located on a top of the vehicle and a cover layer 120 disposed on a bottom surface of the base panel 110. The bottom surface is a surface facing an interior of the vehicle. The base panel 110 includes an edge 111 along a length direction L of the vehicle, and a portion that is adjacent to the edge 111 and has a plurality of notches 112. As shown in FIG. 1, in some embodiments, the base panel 110 has a first portion 113 including a plurality of notches 112 and a second portion 114 including a plurality of notches 112. In some embodiments, the first and second portions 113, 114 of the base panel 110 may correspond to a rear pillar (such as C or D pillar) and a middle pillar (such as B pillar) of the vehicle, respectively. The base panel 110 may further have a third portion 115 including a plurality of notches 112. The third portion 115 may correspond to a front pillar (such as A pillar) or other portions of the vehicle.

In some embodiments, the cover layer 120 has an edge 121 extending beyond the edge 111 of the base panel 110 in a width direction W of the vehicle. In some embodiments, the edge 121 of the cover layer 120 may extend beyond the edge 111 of the base panel 110 in a length direction L. In some embodiments, the edge 121 of the cover layer 120 may extend beyond the edge 111 of the base panel 110 in both directions L and W.

In some embodiments, the cover layer 120 may be attached to a bottom surface of the base panel 110 via adhesives (not shown).

In some embodiments, the base panel 110 and the cover layer 120 may be formed from different materials. For example, the base panel 110 may be formed from materials including but not limited to polyurethane (PU) foam material. The cover layer 120 may be formed from the materials including but not limited to materials selected from one of the groups of knitted fabric, fiber, leather, imitation leather, synthetic material, and combinations thereof. The base panel 110 and cover layer 120 may each be constructed with one layer or several sub-layers (not shown).

The vehicle 500 further includes a side trim disposed at both sides of the interior of the vehicle, for example, rear pillar trim, middle pillar trim, or front pillar trim. As shown in FIG. 1, the side trim includes a first side trim 200 (such as C or D pillar trim) and a second side trim 300 (such as middle pillar trim or B pillar trim). The side trim may form interference fit with the headliner assembly 100. In some embodiments, an upper end or top end of the first side trim 200 corresponds to the first portion 113 of the base panel 110 and contacts the bottom surface of the cover layer 120 so as to form interference fit with the headliner assembly 100.

FIG. 1 also illustrates an airbag 400 disposed above the headliner assembly 100 (for example, disposed on a top surface of the base panel in a height direction H of the vehicle) and adjacent to the edge 111 of the base panel 110. The airbag 400 may be folded or stored on the headliner assembly 100 and facing a metal roof panel in a non-operation state or uninflated state. For example, the airbag 400 is disposed between the headliner assembly 100 and the metal roof panel of the vehicle. In one or more embodiments, the airbag 400 may be a curtain airbag.

Figure 3:
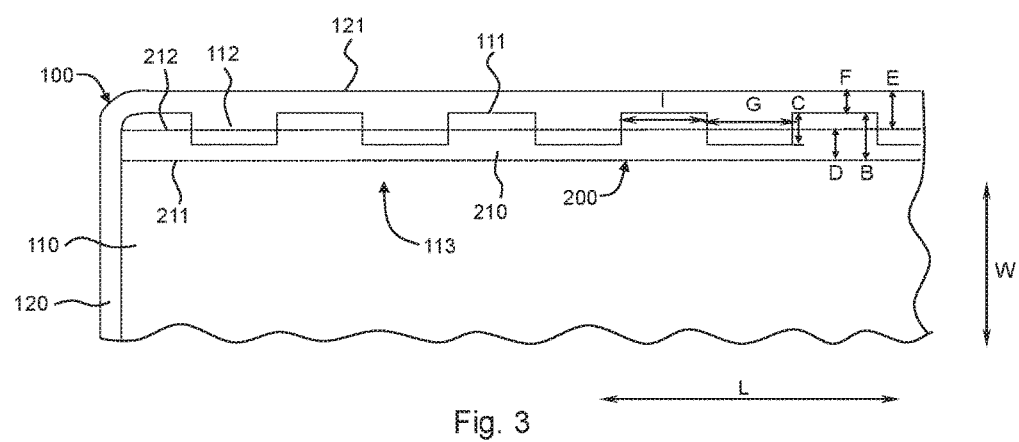
FIG. 3 is a partial enlarged view of the headliner assembly of the vehicle system of FIG. 1.

FIG. 2 is an enlarged partial perspective view for part A of the vehicle system shown in FIG. 1. FIG. 3 is a partial enlarged view of the headliner assembly of the vehicle system shown in FIG. 1, illustrating the first portion 113 of the base panel 110 and a part of the cover layer 120 corresponding to the first portion 113. For the convenience of illustration, the first side trim 200 is shown in dashed lines in FIG. 3. With reference to FIGS. 2 and 3, the upper end 210 of the first side trim 200 has a first edge or an outer edge 211 and a second edge or an inner edge 212. The first edge 211 faces the interior of the vehicle, while the second edge 212 is opposite to the first edge 211. The upper end 210 of the first side trim 200 partially overlaps with the notches 112 of the first portion 113 of the base panel 110 of the headliner assembly 100. In some embodiments, the upper end 210 of the first side trim 200 partially overlaps with the notches 112 of the first portion 113 of base panel 110 in the direction W, or direction L, or both in the direction W and L. For example, a projection of the first side trim 200 on the base panel 110 may partially overlap with the area of the notches 112. Alternatively, a projection of the inner edge 212 of the first side trim 200 on the base panel 110 may be within the area of the notches 112. In other words, as shown in FIG. 3, a distance B (distance in direction W) between the outer edge 211 of the upper end 210 of the first side trim 200 (shown in dashed lines) and the edge 111 of the base panel 110 may be smaller than or equal to the sum of a depth C of one of the notches 112 and a width D of the upper end 210.

In the embodiment depicted in FIG. 3, a projection of the second edge or inner edge 212 of the upper end 210 may be in the depth area of the notches 112, for example, between the top and bottom of the notches 112. In another embodiment (not shown), a width D of the upper end 210 of the first side trim 200 may be smaller than a depth C of the notches. A projection of the upper end 210 may be in the depth area of the notches 112, for example, the projections of both the first and second edges 211, 212 of the upper end 210 on the base panel 110 are between the top and bottom of the notches 112. In an embodiment (not shown), the width D of the upper end 210 may be equal to the depth C of the notches 112, and the first and second edges 211, 212 substantially align with the top and bottom of the notches 112 respectively.

With further reference to FIG. 3, a distance E (e.g. distance in direction W) between the second edge 212 of the upper end 210 of the first side trim 200 and the edge 121 of the cover layer 120 is about 3 mm to about 10 mm. In other words, the cover layer 120 may extend beyond the inner edge or second edge 212 of the first side trim 210 in direction W. In this way, the issue of seeing through the loose lap joint between the headliner and the side trim may be avoided, and better desired sealing between the headliner assembly and the side trim and aesthetic appearance may be achieved.

In some embodiments, the edge 121 of the cover layer 120 may extend beyond the edge 111 of the base panel 110 by a length of about 1 mm to about 3 mm in direction W. In other words, a distance (e.g. distance in direction W) between the edge 111 and the edge 121 may be about 1 mm to about 3 mm. One of the notches 112 in the base panel 110 of the headliner assembly 100 may have a depth C in a range of about 2 mm to about 8 mm, for example, in a range of about 3 mm to about 6 mm, or in a range of about 4 mm to about 5 mm. A distance I between adjacent notches 112 may be substantially equal to the depth C of the notches 112, for example, in a range of about 2 mm to about 8 mm, alternatively in a range of about 3 mm to about 6 mm, or in a range of about 4 mm to about 5 mm. In an embodiment, the width G of notch is equal to depth C, i.e. the notches 112 may have a square cross-section (not shown). In some embodiments, the notches 112 may have a rectangular cross-section as shown in FIG. 3.

It should be appreciated that the ranges listed above are only for illustrative purposes, the distance between the edges or the dimension of the notches are not limited to those ranges listed above, and the ranges may be increased or decreased according to specific requirements for the vehicle.

In the embodiments depicted in FIGS. 2 and 3, the notches 112 in the base panel 110 of the headliner assembly 100 have rectangular cross-sections. However, the cross-sections of the notches may have various configurations. In some embodiments, the cross-section of the notches 112 may have a shape a V-shape, rectangle, semi-circle, trapezoid, and/or combinations thereof.

As described above, the upper end 210 of the first side trim 200 may form interference fit with the headliner assembly 100. In those embodiments, the lap joint area between the side trim and the headliner assembly may correspond to the portion of the headliner assembly having notches which form a relatively weaker joint or weak connection area. During the deployment of the curtain airbag mounted on the headliner assembly, the weaker connection area may decrease a resistance of the base panel to the airbag or weaken the joint strength between the side trim and the headliner assembly, thus facilitating deployment of the airbag.

With reference to FIGS. 1 and 3, in some embodiments, the first portion 113 of the base panel 110 may have a length substantially smaller than, equal to, or larger than that of the connection or joint area between the headliner assembly 100 and the first side trim 200. Similarly, the second portion 114 of the base panel 110 may have a length substantially smaller than, equal to, or larger than that of the connection or joint area between the headliner assembly 100 and the second side trim 300. For example, the notch area of the base panel 110 (for example, the first portion 113 or second portion 114) may be adjusted according to requirements for airbag deployment. For example, the first portion 113 of the base panel 110 may have a length smaller than that of the joint area between the headliner assembly 100 and the first side trim 200, thus the resistance to the airbag during the deployment may be reduced. Alternatively, the first portion 113 of the base panel 110 may have a length larger than that of the joint area to further facilitate the deployment of a curtain airbag in a working state.

In some embodiments, the upper end 210 of the first side trim 200 may have a relative larger surface roughness relative to remaining portions of the first side trim 200. For example, the upper end 210 may have a relatively larger surface roughness relative to lower portions of the first side trim 200 that integrated with the upper end 210 (not labeled). In some embodiments, the upper end 210 may have a top surface with grid-like rough structure. In some embodiments, a gasket is disposed on the top surface of the upper end 210. In this way, a friction resistance between the upper end 210 of the first side trim 200 and the headliner assembly 100 may be increased, thus providing more robust interference fit.

In some embodiments of the present disclosure, the first side trim 200 may be formed with a material different with that of the headliner assembly 100. For example, the first side trim 200 may include but not limited to polypropylene (PP) or formed by PP. The cover layer 120 may be formed with any material selected from a group including fabric, knitted fabric, fiber, leather, imitation leather, synthetic material, and combinations thereof. During assembly, the cover layer 120 contacts with the upper end 210 of the first side trim 200. The first side trim 200 may be harder than the cover layer 120 of the headliner assembly 100 in term of hardness. The upper end 210 may be embedded into the cover layer 120 by a predetermined distance in direction H and form interference with the headliner assembly 100. Therefore, a reliable connection between the headliner 100 and the first side trim 200 may be formed. It should be understood that the first side trim 200 and the headliner assembly 100 may be connected in other forms, for example, via adhesives or fasteners.

In some embodiments, as shown in FIG. 1, the vehicle 500 may further include an airbag 400 disposed above the headliner assembly 100 (for example, on the top surface of the base panel 10 in direction H) adjacent to the edge 111 of the base panel 110. The airbag 400 may be folded or stored on the headliner assembly 100 (for example, between the headliner and the roof sheet metal of the vehicle) in a non-operation state. In a working or operation state, the airbag 400 may be inflated to expand to create a gap between the edge 111 of the base panel 110 and the upper end of the side trim (for example, the upper end 210 of the first side trim 200) and thus the airbag 400 may be deployed downwards the interior of the vehicle (not shown). Specifically, as shown in FIG. 2, during deployment of the airbag 400, the edge 111 of the base panel 110 and the edge 121 of the cover layer 120 may deform to bend downwards while the upper end 210 of the first side trim 200 may deform to substantially bend toward the interior of the passenger compartment, and a gap is formed between the headliner assembly 100 and the first side trim 200 to allow the downward deployment of the airbag 400.

In some embodiments, the airbag 400 is configured as a curtain airbag. During a side impact of the vehicle, the curtain airbag may be inflated to deploy from the roof of the vehicle and located between the passengers and the side panel of the vehicle, and thus reduce impact to passengers.

In some embodiments, the first side trim 200 may be a front pillar trim (for example, a trim covered on a metal A pillar of the vehicle) or a rear pillar trim (for example, a trim covered on a metal C or D pillar of the vehicle). In some embodiments, independent airbags (not shown) may be disposed at areas corresponding to the front and/or rear pillar trim above the headliner assembly, which may be deployed individually to protect both front passenger and rear passenger in the vehicle.

With reference to FIG. 1, the vehicle 500 further includes a second side trim 300. The base panel 110 further includes a second portion 114 having a plurality of notches 112 at the edge 111 in direction L. The second side trim 300 has an upper end 310 corresponding to the second portion 114 of the base panel 110 and being positioned under the bottom surface of the cover layer 120 to form interference fit with the headliner assembly 100.

In some embodiments, the second side trim 300 may be a middle pillar trim, including but not limited to a trim covered on a metal B pillar of the vehicle. In such embodiments, an airbag is disposed on the top surface of the base panel adjacent the whole length of the headliner assembly in direction L (as shown in FIG. 1). In this way, during deployment of the airbag, the side trim (including but not limited to front pillar trim, middle pillar trim, or rear pillar and the headliner assembly may be disengaged to form a gap therebetween which may facilitate the deployment of the airbag. In this embodiment, a side air curtain may be formed along an entire length in passenger compartment in direction L to protect both front and rear passengers after airbag deployment.

The structures of the second side trim 300 and the second portion 114 of the base panel 110 as well as the connection between the second side trim 300 and the headliner assembly 100 (for example, lap joint or interference fit) may be similar to those described above regarding to the first portion 113 of the base panel 110 and the first side trim 200. For the sake of brevity, detailed descriptions of those are omitted herein.

Embodiments of the present disclosure further provide a headliner assembly for the vehicle, which will be described in detail with reference to FIGS. 2 and 3.

With reference to FIGS. 1-3, a headliner assembly 100 accordingly to embodiments of the present disclosure is illustrated. The headliner assembly 100 includes a base panel 110 and a cover layer 120 disposed below the base panel 110 in a height direction H of the vehicle. As shown in the figures, the base panel 110 has an edge 111 in a length direction L of the vehicle which includes a plurality of notches 112, and an edge 121 of the cover layer 120 extends beyond the edge 111 of the base panel 110. In other words, the cover layer 120 may be longer than the base panel 110 at least in a width direction W of the vehicle.

The headliner assembly of the present disclosure has several advantages. For example, a cover layer of the headliner assembly extends beyond the base panel, and thus avoiding sealing problem and providing good aesthetic appearance. Further, the base panel has an edge having notches which form a relatively weaker area to facilitate the deployment of the airbag during the side impact event. Furthermore, the headliner assembly of the present disclosure is simple in structure, low in cost, and easy to prepare and assemble, and can be used in various kind of vehicles.

According to another aspect of the present disclosure, a method of preparing a headliner assembly is provided. An example method for preparing the headliner assembly of the present disclosure is described below with reference to FIG. 4.

Figure 4:
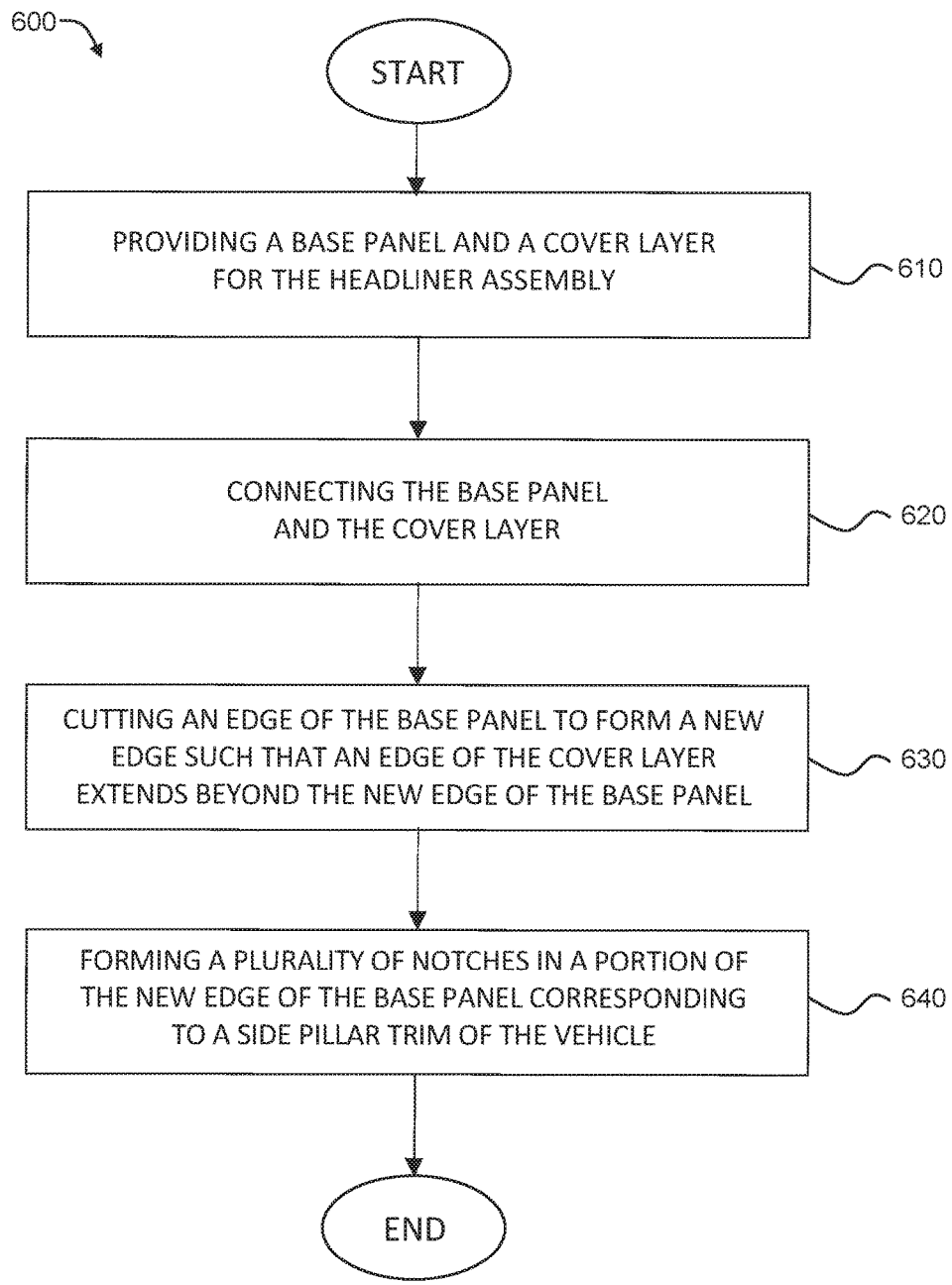
FIG. 4 is a flow chart illustrating a method for preparing a headliner assembly for a vehicle according to an example embodiment of the present disclosure.

FIG. 4 illustrates a method for preparing a headliner assembly 600 according to an example embodiment of the present disclosure. At 610, the method 600 includes providing a base panel and a cover layer for the headliner assembly. As described, the base panel may be formed from the materials including but not limited to polymer foam material, such as polyurethane foam material. The cover layer may be formed from the materials including but not limited to fabric, knitted fabric, fiber, leather, imitation leather, synthetic material, and any combinations thereof.

At 620, the method 600 includes connecting the base panel and the cover layer. In some embodiments, the cover layer may be attached to a surface of the base panel via adhesives. In some embodiments, the base panel and the cover layer may be connected together by press molding.

At 630, the method 600 includes cutting an edge of the base panel to form a new edge such that an edge of the cover layer extends beyond the new edge of the base panel. In other words, the edge of the base panel is cut so that a width or a length of the base panel may be less than that of the cover layer. In some embodiments, the cutting may be performed with a water cutting process.

At 640, the method 600 includes forming a plurality of notches in a portion of the new edge of the base panel corresponding to a side pillar trim of the vehicle. In some embodiments, forming the notches may be performed by a water cutting process.

It should be appreciated that cutting an edge of the base panel and forming notches in the new edge of the base panel may not be limited to water cutting process. Those with ordinary skill in the art may select an appropriate approach to perform these steps. In addition, cutting an edge of the base panel and forming notches in the new edge of the base panel may be performed with one single step. For example, a cutting tool may travel a path that defines an edge of the base panel, that is, the path of a straight line and a line defining a plurality of notches at some portions. Alternatively, the cutting the edge and forming the notches may be performed with several steps, for example, cutting an original edge of the base panel first and then forming the notches in the new edge.

In addition, the adhesives and press molding are known to those skilled in the art, and thus detail processes are omitted herein.

In the headliner assembly prepared by the method 600, the cover layer may be longer than the base panel in a width direction or length direction of the base panel, and thus the headliner assembly may properly be connected with the side trim of the vehicle and have satisfied sealing performance as well as aesthetic appearance. Notches formed in the edge portion of the base panel may define an area with a weakened strength relative to the remaining portions of the base panel (e.g., middle portion of the edge of the base panel between). The weakened area is easy to be deformed under a force so as to facilitate the deployment of the airbag under a side impact event.

As described above, the headliner assembly includes a base panel and a cover layer extending beyond the base panel in direction W or direction L of the vehicle and the base panel has a portion with a notch area corresponding to a side trim. In this way, the cover layer conceals the base panel and thus avoids seeing through issues. Further, the portion of the base panel having notches may be deformed easily during a side impact crash, which can decrease the resistance to the deployment of the airbag from the base panel and facilitate the deployment of the airbag. Further, the headliner assembly of the present disclosure may provide desired sealing and aesthetic appearance, and facilitate deployment of the airbag.

While exemplary embodiments are described above, it is not intended that these embodiments describe all possible forms encompassed by the claims. The embodiments described above are specific examples that do not describe all possible forms of the disclosure. The features of the illustrated embodiments may be combined to form further embodiments of the disclosed concepts. The words used in the specification are words of description rather than limitation, and it is understood that various changes can be made without departing from the spirit and scope of the disclosure. The scope of the following claims is broader than the specifically disclosed embodiments and also includes modifications of the illustrated embodiments.

What is claimed is:

1. A headliner assembly for a vehicle, comprising:
    a base panel having an edge in a length direction of the vehicle and a portion adjacent to the edge and having a plurality of notches, wherein the portion is configured such that the plurality of notches are partially overlapped with a side trim of the vehicle at an assembled position in the vehicle; and
    a cover layer disposed below the base panel in a height direction of the vehicle, wherein the cover layer has an edge extending beyond the edge of the base panel.

2. The headliner assembly of claim 1, wherein the edge of the cover layer extends beyond the edge of the base panel by a distance of about 1 mm to about 3 mm in a width direction of the vehicle.

3. The headliner assembly of claim 1, wherein one of the notches has a shape selected from one of V-shape, rectangle, semi-circle, trapezoid, and any combinations thereof.

4. The headliner assembly of claim 1, wherein one of the notches has a depth of about 2 mm to about 8 mm.

5. The headliner assembly of claim 1, wherein the cover layer is attached to a bottom surface of the base panel via adhesives.

6. The headliner assembly of claim 1, wherein the base panel is formed with polymer foam material and the cover layer is formed with fabric.

7. A vehicle system comprising:
    a base panel disposed on a top of a vehicle, wherein the base panel includes an edge in a length direction of the vehicle and a first portion adjacent to the edge and having a plurality of notches;
    a cover layer disposed below the base panel in a height direction of the vehicle and having an edge extending beyond the edge of the base panel in a width direction of the vehicle; and
    a first side trim has an upper end corresponding to the first portion of the base panel and contacting a bottom surface of the cover layer to form interference fit with the base panel and the cover layer,
    wherein the upper end of the first side trim at least partially overlaps with the notches of the base panel in the width direction.

8. The vehicle system of claim 7, wherein the first portion of the base panel has a length substantially smaller than, equal to, or greater than that of the first side trim in the length direction.

9. The vehicle system of claim 7, wherein a distance between an outer edge of the upper end of the first side trim and an outer edge of the cover layer is about 3 mm to about 10 mm.

10. The vehicle system of claim 7, wherein the upper end of the first side trim has a greater surface roughness than remaining portions of the first side trim.

11. The vehicle system of claim 7, furthering comprising an airbag disposed above the base panel in the height direction and adjacent to the edge of the base panel, and the airbag is configured to be inflated in a working state and deployed from a gap formed between the edge of the base panel and the upper end of the first side trim upon a side impact collision.

12. The vehicle system of claim 11, wherein the airbag is a curtain airbag.

13. The vehicle system of claim 7, wherein the first side trim is a front or rear pillar trim of the vehicle.

14. The vehicle system of claim 13, further comprising a second side trim of the vehicle, wherein the base panel further has a second portion adjacent to the edge in the length direction and having a plurality of notches, the second side trim has an upper end corresponding to the second portion of the base panel and contacting the bottom surface of the cover layer to form interference fit with the base panel and the cover layer, and wherein the second side trim is a middle pillar trim of the vehicle.

15. A method for preparing a headliner assembly for a vehicle, comprising:
   providing a base panel and a cover layer;
   cutting an edge of the base panel to form a new edge such that the cover layer has an edge extending beyond the new edge of the base panel; and
   forming a plurality of notches in a portion of the new edge of the base panel, wherein the plurality of notches are in the portion corresponding to a side trim of the vehicle.

16. The method of claim 15, wherein
   forming the plurality of notches includes cutting the new edge of the base panel to form the plurality of notches.

17. The method of claim 15, wherein cutting the edge of the base panel and cutting the new edge of the base panel to form the plurality of notches are performed with one single cutting step.

18. The method of claim 15, wherein the cutting is performed by a water cutting process.

19. The method of claim 15, wherein providing the cover layer comprises attaching the cover layer to a surface of the base panel via adhesives or connecting the base panel and the cover layer together via press molding.

* * * * *